July 1, 1958
D. K. O'BRIEN
2,841,206
WEIGHTED SPRING TRACTOR SEAT
Filed May 10, 1957
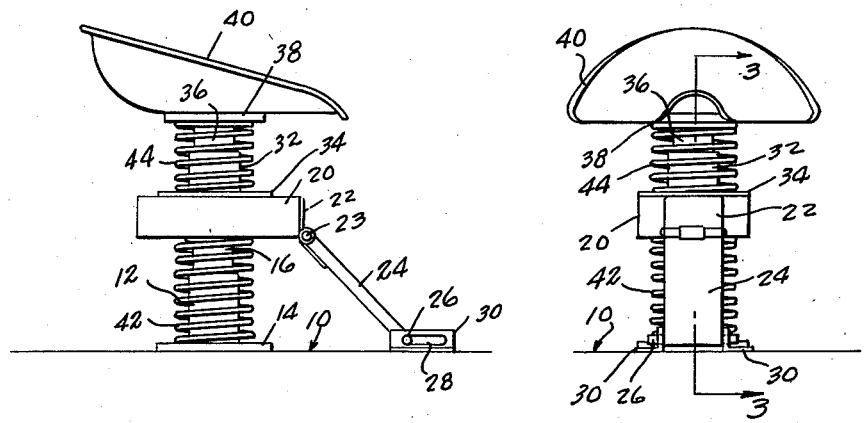
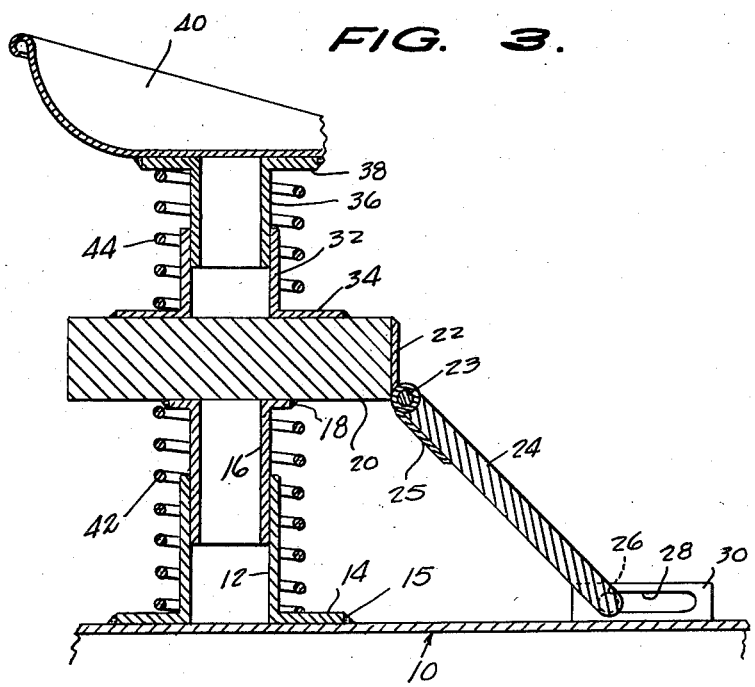
INVENTOR.
DELPHENUS K. O'BRIEN,
BY
McMorrow, Berman + Davidson
ATTORNEYS.

United States Patent Office 2,841,206
Patented July 1, 1958

2,841,206

WEIGHTED SPRING TRACTOR SEAT

Delphenus K. O'Brien, Lincoln, Nebr.

Application May 10, 1957, Serial No. 658,255

2 Claims. (Cl. 155—52)

This invention relates to tractor seats, and more particularly has reference to a tractor seat to which will be resiliently, yieldably supported, so as to absorb shocks to a substantial degree, with the seat being specially designed in a manner to insure maximum comfort so far as the operator is concerned.

One important object is to provide a tractor seat which will include a heavy weight the particular location of which is such, relative to the seat and the associated support structure, as to provide an especially good balance of the seat, and to provide, further, a highly effective shock-dampening action in conjunction with springs disposed above and below the weight.

Another object is to provide, in a seat of the character described, an arrangement in which the weight has a sliding, pivotal connection to the support structure, particularly designed to control the up and down movement of the weight.

Another object is to include, in association with the weight having the sliding pivotal connection described, shock absorbers and spring means disposed both above and below the weight, the whole combining to produce an especially effective resilient, shock-absorbent mounting for a tractor seat or the like.

Other objects will appear from the following description, the claims appended thereto, and from the annexed drawing, in which like reference characters designate like parts throughout the several views, and wherein:

Figure 1 is a side elevational view of a tractor seat according to the invention;

Figure 2 is a front elevational view thereof as seen from the right of Figure 1; and Figure 3 is a vertical sectional view, on an enlarged scale, taken substantially on line 3—3 of Figure 2.

Referring to the drawings in detail, designated at 10 is a tractor body or frame, on which is mounted the tractor seat constituting the present invention.

The tractor seat includes a lower shock absorber formed with an upwardly opening, vertically disposed base cylinder 12 flanged at 14 at its lower end, with the flange being welded or otherwise fixedly secured at 15 to the tractor frame 10. An inner cylinder 16 of the lower shock absorber assembly slidably telescopes in the upper end of the cylinder 12, and is formed at its upper end with an outwardly directed flange 18 welded or otherwise fixedly secured to the underside of a thick, flat weight 20 that projects at its forward and rear ends substantial distance by the cylinders, while projecting at its sides (see Figure 2) outwardly from the cylinders to a substantially lesser degree.

To the front end of weight 20 is secured a hinge leaf 22 connected by a pin 23 to a cooperating hinge sleeve 25, that is secured to a rectangular, flat hinge plate 24 declining forwardly from the weight. Plate 24 at its lower end receives a pin 26 extending through horizontal, longitudinal, closed slots 28 formed in confronting angle brackets 30 fixedly secured to tractor frame 10.

An upper shock absorber assembly includes a base cylinder 32 having a bottom flange 34 welded to the top surface of weight 20. An inner cylinder 36 of the upper shock absorber assembly telescopes in cylinder 32, and has an outwardly directed flange 38 at its upper end welded to the underside of the seat member 40.

A compression, coil spring 42 is interposed between base flange 14 and weight 20, and a similar spring 44 is interposed between flange 38 and flange 34.

Of course, the shock absorbers can be of various types, and could for example be of the hydraulic type. The shock absorbers are illustrated somewhat diagrammatically, but in every instance it will be noted that shock absorbent means is provided both above and below the weight 20, which has a sliding, pivotal connection to the tractor frame, such as to particularly control the up and down movement of the weight 20. The arrangement assures that the weight will be caused to move only in a vertical path, that is, axially of the cylinders, without possibility of displacement of the weight laterally, or to the front or rear.

The arrangement has been found to produce particularly desirable results, in that shocks are absorbed or dampened to a high degree, although the construction is quite simple. At the same time, although shocks are effectively dampened, bouncing of the seat member 40 is reduced to a minimum, and it is believed that this may be due to the location of the weight 20 between shock absorbers of the type illustrated, taken in conjunction with the connection 24 which the weight has to the tractor frame.

It is believed apparent that the invention is not necessarily confined to the specific use of uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A seat for a tractor or similar structure comprising a lower shock absorber assembly comprising an upwardly opening vertically disposed base cylinder having on its lower end a flange adapted to be fixedly secured to said structure, an upstanding inner cylinder having the portion adjacent the lower end slidably telescoping into the upper end of said base cylinder, a weight in the form of a block extending across and attached to the upper end of said inner cylinder, a compression spring circumposed about said base and inner cylinders and having the lower end bearing against said frame and having the upper end bearing against said weight, an upper shock absorber assembly carried by said weight, a seat member carried by the upper assembly, and means connected between the weight and said structure adapted to cause the weight to travel in a path coaxial with respect to the assembly.

2. The seat according to claim 1 wherein said upper shock absorber assembly comprises an upwardly opening vertically disposed base cylinder having on its lower end a flange fixedly secured to said weight, an upstanding inner cylinder having the portion adjacent the lower end slidably telescoping into the upper end of the base cylinder, and a compression spring circumposed about said base and inner cylinders and having the lower end bearing against the flange of said base cylinder and having the upper end bearing against said seat member.

References Cited in the file of this patent

UNITED STATES PATENTS

| | | |
|---|---|---|
| 1,171,297 | Adams | Feb. 8, 1916 |
| 1,417,744 | Kent | May 30, 1922 |
| 2,272,344 | Kimbro | Feb. 10, 1942 |
| 2,672,915 | Jones | Mar. 23, 1954 |